Patented Oct. 5, 1926.

1,602,200

UNITED STATES PATENT OFFICE.

PAUL S. OTTO, OF WATERLOO, IOWA.

NONHARDENING ADHESIVE FOR PAPERS.

No Drawing.      Application filed March 13, 1925. Serial No. 15,361.

My invention relates to improvements in non-hardening adhesives for papers, and the object of my improvement is to supply an adhesive composition for pasting layers of papers together, such as in mounting photographic or other prints or otherwise, and which composition possesses the properties of being waterproof, permitting an easy removal of one layer of paper from another without injury, and in not causing a curling of the pasted papers.

My improved adhesive composition includes the following ingredients: 21 percent of clean unvulcanized rubber, 76 percent of benzene, 2 percent of ether, 0.5 percent of ammonia in solution, 0.5 percent of acetone.

The more important ingredients are the first three mentioned, and the rubber should be clean and unvulcanized. The benzene acts as a solvent for the rubber, while the other ingredients cooperate therefor and keep it homogeneous for ready application to the surfaces to be coated, without separation or quick drying.

As an agglutinant, other materials beside papers may be treated and secured together by it. An important function is its use as a paste or agglutinant for the mounting of photographic paper prints, as it will not cause the curling of the prints. It is non-staining, waterproof, and permits separation of adherent papers by peeling. It is applied in any convenient way to the surfaces, and may be used effectively by coating both surfaces thinly, allowing about two minutes for the treated surfaces to become tacky before they are opposed, so that the adhesion shall be most perfect.

Because of the non-hardening, and tacky state, one of the papers or prints may be easily stripped away from the other at any later time, without tearing either, by lifting an edge of one paper from the other and peeling it off. The coating remaining will serve to secure the removed piece upon some other base, similarly coated.

I claim:

An adhesive composition, consisting of a mixture of 76 parts of benzene, 2 parts of ether, one half part of solution of ammonia, one half part of acetone, in which 21 parts of clean unvulcanized rubber are dissolved.

In testimony whereof I affix my signature.

PAUL S. OTTO.